(12) United States Patent
Nordahl

(10) Patent No.: US 8,095,568 B2
(45) Date of Patent: Jan. 10, 2012

(54) SYSTEM AND METHOD FOR ASSISTING USER SEARCHES IN SUPPORT SYSTEM

(75) Inventor: Mats Nordahl, Trångsund (SE)

(73) Assignee: Tific AB, Gothenburg (SE)

( * ) Notice: Subject to any disclaimer, the term of this patent is extended or adjusted under 35 U.S.C. 154(b) by 462 days.

(21) Appl. No.: 12/385,849

(22) Filed: Apr. 21, 2009

(65) Prior Publication Data

US 2009/0265341 A1    Oct. 22, 2009

Related U.S. Application Data

(60) Provisional application No. 61/071,291, filed on Apr. 21, 2008.

(51) Int. Cl.
*G06F 7/00* (2006.01)
(52) U.S. Cl. ........................................... 707/797
(58) Field of Classification Search .................. 707/791, 707/796, 797
See application file for complete search history.

(56) References Cited

U.S. PATENT DOCUMENTS

| | | | |
|---|---|---|---|
| 5,107,500 A | 4/1992 | Wakamoto et al. | |
| 5,678,002 A | 10/1997 | Fawcett et al. | |
| 5,944,839 A * | 8/1999 | Isenberg | 714/26 |
| 5,983,364 A | 11/1999 | Bortcosh et al. | |
| 6,145,096 A | 11/2000 | Bereiter et al. | |
| 6,615,240 B1 | 9/2003 | Sullivan et al. | |
| 6,658,598 B1 | 12/2003 | Sullivan | |
| 6,742,141 B1 | 5/2004 | Miller | |
| 6,785,834 B2 | 8/2004 | Chefalas et al. | |
| 7,020,643 B2 * | 3/2006 | Mah et al. | 706/46 |
| 7,827,170 B1 * | 11/2010 | Horling et al. | 707/722 |
| 2006/0173842 A1 * | 8/2006 | Horvitz et al. | 707/6 |
| 2007/0112768 A1 * | 5/2007 | Majumder | 707/7 |
| 2009/0083222 A1 * | 3/2009 | Craswell et al. | 707/3 |
| 2009/0157643 A1 * | 6/2009 | Gollapudi et al. | 707/5 |

* cited by examiner

*Primary Examiner* — Angela Lie
(74) *Attorney, Agent, or Firm* — Harness, Dickey & Pierce, P.L.C.

(57) ABSTRACT

The invention concerns a method for assisting user searches in a support system and a system for performing the method which comprises the steps of providing a support data structure with nodes comprising support information of a support database, and providing at least one behavioral data structure comprising information about the time the user(s) spend at said nodes, and information about the transition probabilities between each upper node and its lower nodes, and calculating for each lower node that is located below a current node, navigated to by a user of the support data structure, the expectation value of the time gained by navigating directly to that lower node, and selecting at least one of the lower nodes based on said expectation value.

11 Claims, 6 Drawing Sheets

Score(71)=$(t_1+t_2+t_3)\cdot(P_1\cdot P_2\cdot P_3)$

SYSTEM AND METHOD FOR ASSISTING USER SEARCHES IN SUPPORT SYSTEM

This application claims the priority of U.S. Provisional Patent Application No. 61/071,291, filed Apr. 21, 2008, in the United States Patent and Trademark Office, the disclosure of which is incorporated herein in its entirety by reference.

FIELD OF THE INVENTION

The present invention relates to automated computer support in a distributed computer environment, and in particular to a method for assisting users of self-help systems for automated computer support by providing recommendations that minimize the effort in searching large databases.

BACKGROUND OF THE INVENTION

Information technological devices such as personal computers, handheld devices such as mobile phones and portable media players, and processors embedded in various kinds of equipment are becoming ubiquitous in our everyday environment. At the same time, these devices and their associated software are continually increasing in complexity, leading to an increased need for resolution of complex support issues.

Most computer support today is provided through telephone support. Telephone support is very labor intensive, and the cost per support call is unavoidably high. As a consequence the purchase price of a personal computer is only a small fraction of the total cost of ownership for most organizations.

Also, support incidents not only generate direct costs—they also cause indirect cost, both because of the productive time lost for the user with a computer problem, and because other employees may need to spend their time in helping out. Thus there are very significant economic gains to be made if the process of computer support could be automated to a larger extent within companies. Since many users encounter similar problems, in particular in more homogenous software environments such as those often found within large corporations, such automated solutions could be advantageous even if they handle only a subset of all possible problems.

Furthermore, telephone support is a less than ideal solution from a working environment perspective. Telephone support is often carried out at large call centers which mostly handle simple repetitive tasks, since many users encounter identical problems. Organizations can thus gain an advantage by providing more rewarding tasks for their employees and letting common repetitive tasks be solved by an automated system.

Several systems have been proposed where both problem diagnosis and problem resolution is automated in computer systems. Such systems have often been based on well-known methods from artificial intelligence, such as expert systems or case-based reasoning. Some examples are U.S. Pat. No. 5,107,500, U.S. Pat. No. 5,944,839, U.S. Pat. No. 5,678,002, U.S. Pat. No. 5,983,364, U.S. Pat. No. 6,742,141 B1, U.S. Pat. No. 6,145,096, and U.S. Pat. No. 6,785,834.

Another approach towards more cost-effective computer support is to let the end user take an active role in the diagnosis and resolution of problems, so called self-help. Self-help may for take the form of web-based support databases, where the user is provided with a large number of alternative diagnoses and solutions to a technical problem, and has to choose between these himself.

Self-help could also involve communicating with a computer program which attempts to interpret information provided by the user, and also analyzes the state of the user's system, in order to guide the user to a solution of the problem. The user may also automatically be connected to a human support technician in cases where the system fails to resolve the problem at hand. Such systems have previously been described, e.g., in U.S. Pat. No. 6,615,240.

However, it can be very difficult for an ordinary computer user to find relevant technical information in a large database, even with the assistance of a self-help system. A large database of computer support information could today consist of 105 to 106 technical articles (an example is Microsoft Technet, which currently contains at least 150,000 articles). This number is likely to increase significantly in the future as systems become more complex, making the task of navigating a comprehensive support database even more difficult.

It is therefore essential to minimize the number of questions asked of the user and the number of alternatives presented in a self-help system. This will serve to increase user acceptance of self-help systems, and increase productivity in the support process.

One way of addressing this need is to use information from automated diagnosis tools that determine various aspects of the state of the user's system. This information can be used to guide the search process and to reduce information overload by filtering out alternatives that are irrelevant to the current support context. Such systems have been described, e.g., in U.S. Pat. No. 6,658,598.

However, the amount of support information remaining after filtering may still be very large, making search difficult for the user. This is particularly likely to occur when the support interaction involves limited knowledge of the system on the user's part rather than an actual system fault that could be detected automatically. In these cases, an understanding of typical user behavior is also needed to provide an effective guided search process.

It would therefore be beneficial to provide a system and a method for assisting the user in the search process so that the effort in finding a solution to a support problem is minimized.

SUMMARY OF THE INVENTION

Intelligent self-help systems have considerable potential for making the computer support process more efficient. However, in order for such systems to become widely adopted by computer users, the process of finding information in very large databases of support information must be simplified as much as possible for the user. This can be accomplished by using not only automated filtering techniques to present only information relevant to the user's system, but also allowing the system to learn from the behavior of the users of the support system in order to provide more effective recommendations.

The invention described herein provides a system and a method for assisting the user in the search process so that the effort in finding a solution to a support problem is minimized. Embodiments of the invention contain functionality for learning from user behavior, and/or functionality for correlating this information with essential features of the state of the user's system, e.g. obtained through automated diagnosis. In this way, the system can provide more effective recommendations for a solution. It can also adapt to the individual user to provide better recommendations, for example by taking problems occurring frequently for a particular user into account when recommending shortcuts.

Through the ability to learn from the aggregated behavior of all users of the support system, the system can also provide early warning of new problems affecting many users.

Hence, preferred embodiments of the system may have the ability to learn from the aggregated behavior of all users of the support system, which also can provide early warning of new problems affecting many users. It should also be possible to adapt to the individual user, for example by taking problems occurring frequently for a particular user into account when recommending shortcuts.

The invention provides a system and a method for predicting user behavior and for using that information to make recommendations that simplify and minimize the effort involved in searching large databases of support information.

The invention may e.g. be integrated into a support system consisting of a client program running on the user's machine, which communicates over a network with a server containing a database of support information. The client program serves as a self-help tool for a user who experiences a problem.

The client program could e.g. be a free-standing application or a plug-in to a web browser. Depending on the implementation it may run continuously in the background, and be invoked automatically when a fault condition occurs, or it could be started by the user when there is a support need. Preferably, the client program is assumed to contain at least one of:

- functionality for communicating with the user through a graphical user interface (or by other means, such as audio), in order to get information about the support incident and to guide the user to a solution.
- functionality for communicating with the server, in order to receive the relevant support information, and to transmit information from the user.
- functionality for investigating the state of user's system, both properties of the installation and the current system state, and for carrying out any action needed to resolve a problem.

The client program preferably includes a virtual machine that interprets information stored and transmitted as code to perform any action, including displaying information, interacting with the user, and carrying out changes to the user's system. The code could be written in a language specially designed for support purpose, for example implemented as a graphical programming language, or in a conventional programming language.

The client program may also contain functionality for storing part of or all support information locally in a cache memory, which is updated (preferably periodically). In this way, the system may stay functional even if there is no way of connecting to the network.

Preferably the server stores support information in a database and communicates with the clients over a network. The database may contain support information in the form of text and other media such as images, video and audio files, as well as executable code. The support information is created in a separate authoring environment designed to allow support personnel with varying technical backgrounds to easily create support content, including automated diagnosis functionality and bug fixes.

Preferably the predictive system is assumed to be integrated with a support system such as that described above, and provide the user with suggested shortcuts during the entire search process, until a solution to the current problem is found. The shortcuts are presented as a list of suggestions in the user interface, and may involve suggestions for immediate solutions to the user's problem as well as suggestions that lead to further questions and continued interaction with the support system.

The system continually gathers information on the search behavior of the users of the support system, and/or on an individual basis, and on the aggregated behavior of the entire user community. Information on the search behavior of the users may be stored together with details of the user's system, as well as feedback on the success of the suggested solutions. In particular, the system continuously updates estimates of the transition probabilities between different items in the database together with context information relating to the user's system.

The statistical information gathered is preferably used by a machine learning system in order to predict what information the user is searching for. These predictions may be used as shortcuts suggested to the user in the search process. New predictions can be made at each step in the search process, allowing the predictions to gradually become more precise during the search process.

The shortcuts suggested to the user may be both nodes which contain recommendations for immediate solutions and nodes that involve further requests for information from the user or further automated diagnostic queries. Recommending an immediate solution will save more time provided that the recommendation is correct and chosen by the user, but may on the other hand be applicable in fewer cases. Recommending an intermediate node which involves some additional queries but applies to more cases could on the average be a preferable strategy.

The predictions are based on a model of user behavior, and are preferably selected to maximize the expectation value of the search time saved for the user. The probabilities of different alternatives are estimated from the statistical data on earlier user behavior. This provides a method for fair comparison between recommendations for immediate solutions and recommendations that involve further queries. The model of user search behavior is preferably also inferred from actual user data gathered in the system.

The use of statistical information about the behavior of other users on the same server provides the system with a form of collective intelligence. Problems encountered by many other users will create search trails to that information. In this way, problems already encountered by a number of users of the support system become more likely to be suggested to the next individual encountering the same problem.

The system may collect data both on the average behavior of all users and/or on the individual user behavior. By allowing the data on individual user behavior to modify the global data, the system can adapt to individual features of the user's system. For example, if a certain type of problem is more likely to occur for a user, that problem area becomes more likely to appear as a recommendation.

Embodiment of the system of the invention may also collect data on several different time scales. This allows the system to respond to new problems that may appear, and to serve as an early warning system. In situations where a new problem suddenly appears, for example after a system update in a fairly homogenous environment, then if a solution to the problem already exists in the database it will automatically appear as a suggestion to all users once a smaller number of users have encountered the problem. Or in the case where there is no solution in the database, the system can detect that certain search patterns become more frequent, and alert support personnel that a new item needs to be added to the database.

In this way the invention provides a simplified and efficient way of searching for information in a large database of support information. The principle of the invention can be extended in many different ways and applied to many different contexts, as described further in the following section describing the preferred embodiment and illustrated by the drawings described below.

Particular embodiments if the invention may be described as follows:

A first embodiment of the invention is directed to a method for assisting user search in a support system. The method comprises the steps of: providing a support data structure with nodes comprising support information of a support database, providing at least one behavioral data structure comprising information about the time the user(s) spend at said nodes, and information about the transition probabilities between each upper node and its lower nodes, and the steps of calculating for each lower node that is located below a current node, navigated to by a user of the support data structure, the expectation value of the time gained by navigating directly to that lower node, and the steps of selecting at least one of the lower nodes based on said expectation value.

Said selection may e.g. correspond to the selection and execution of an action to be taken, or to the selection and presentation of a list comprising possible actions from which the user may in turn select and execute an action.

A second embodiment of the invention, comprising the features of the first embodiment, is directed to a method comprising the steps of: providing at least one global behavioral data structure in a server arrangement being used by several user devices and which at least comprises the support data structure.

A third embodiment of the invention, comprising the features of the first embodiment, is directed to a method comprising the steps of: providing at least one local behavioral data structure or at least one global behavioral data structure in a user device which at least comprises a copy of the support data structure.

A fourth embodiment of the invention, comprising the features of the first embodiment, is directed to a method comprising the steps of: updating at least one of; the time the user(s) spend at said nodes, or the transition probabilities of the behavioral data structure when a user of the support data structure makes a transition in the support data structure using a user device.

Preferably only one transition probability is updated if the user e.g. makes a transition directly from one node to an adjacent underlying node, whereas a plurality of transition probabilities may be updated if the user e.g. makes a shortcut transition from one node to another node such that one or several intermediate nodes are passed by the shortcut without being visited.

A fifth embodiment of the invention, comprising the features of the fourth embodiment, is directed to a method comprising the steps of: updating the time or transition probabilities provided that the transition is confirmed by a positive user feedback.

A sixth embodiment of the invention, comprising the combined features of the second and third embodiments, is directed to a method comprising the steps of: transmitting information from the local behavioral data structure of each user device to the support server so as to update the global statistical data structure.

A seventh embodiment of the invention, comprising the features of the first embodiment, is directed to a method comprising the steps of: providing the behavioral data structure with information about the properties of a user system, and increasing or decreasing at least one of the transition probabilities with respect to that user system depending on said properties.

An eighth embodiment of the invention, comprising the features of the first embodiment, is directed to a method comprising the steps of: selecting a lower node if the expected time gain is higher than a predetermined threshold.

A ninth embodiment of the invention, comprising the features of the first embodiment, is directed to a method comprising the steps of: presenting a recommendation providing a short-cut to said at least one selected lower node.

A tenth embodiment of the invention, comprising the features of the first embodiment, is directed to a method comprising the steps of: providing a number of copies of said behavioral data structures, each storing an estimate of the transition probabilities on different time scales, and issuing a warning if one or more corresponding transition probabilities belonging to different time scales diverge from each other more than a predetermined amount.

An eleventh embodiment of the invention is directed to a support system for assisting user searches, which system comprises: a support data structure with nodes comprising support information of a support database, and at least one behavioral data structure comprising information about the time the user(s) spend at said nodes, and information about the transition probabilities between each upper node and its lower nodes. The system is arranged to operatively: calculate for each lower node that is located below a current node, navigated to by a user of the support data structure, the expectation value of the time gained by navigating directly to that lower node, and select at least one of the lower nodes based on said expectation value.

Said selection may e.g. correspond to the selection and execution of an action to be taken, or to the selection and presentation of a list comprising possible actions from which the user may in turn select and execute an action.

A twelfth embodiment of the invention, comprising the features of the eleventh embodiment, is directed to a system comprising a sever arrangement at least comprising the support data structure and at least comprising one global behavioral data structure arranged to be operatively used by several user devices.

The server arrangement (e.g. the database) may be able operatively perform the necessary calculations and selections or similar.

A thirteenth embodiment of the invention, comprising the features of the eleventh embodiment, is directed to a system comprising a user device at least comprising a copy of the support data structure and at least one local behavioral data structure or at least one global behavioral data structure.

The user device (e.g. a client program therein) may be able operatively perform the necessary calculations and selections or similar.

A fourteenth embodiment of the invention, comprising the features of the eleventh embodiment, is directed to a system arranged to operatively update at least one of; the time the user(s) spend at said nodes, or the transition probabilities of the behavioral data structure, when a user of the support data structure makes a transition in the support data structure using a user device.

The server arrangement (e.g. a database therein) may perform the update if the transition is made in a support data structure in the server arrangement, whereas the user device (e.g. a client program therein) may perform the update if the transition is made in a copy of the support data structure in the user device.

A fifteenth embodiment of the invention, comprising the features of the fourteenth embodiment, is directed to a system arranged to operatively update the time or transition probabilities provided that the transition is confirmed by a positive user feedback.

A sixteenth embodiment of the invention, comprising the combined features of the twelfth and thirteenth embodiments, is directed to a system arranged to operatively transmit information from the local behavioral data structure of each user device to the support server so as to update the global statistical data structure.

A seventeenth embodiment of the invention, comprising the features of the eleventh embodiment, is directed to a system wherein the behavioral data structure comprises information about the properties of a user system, and wherein the system is arranged to operatively increase or decrease at least one of the transition probabilities with respect to that user system depending on said properties.

The server arrangement (e.g. a database therein) may perform the increase or decrease with respect to a global behavioral data structure therein, whereas the user device (e.g. a client program therein) may perform the increase or decrease with respect to a local behavioral data structure therein.

An eighteenth embodiment of the invention, comprising the features of the eleventh embodiment, is directed to a system arranged to operatively select a lower node if the expected time gain is higher than a predetermined threshold.

A nineteenth embodiment of the invention, comprising the features of the eleventh embodiment, is directed to a system arranged to operatively present a recommendation that provides a short-cut to said at least one selected lower node.

The presentation may e.g. be done by the server arrangement or a control center interface or a user device, e.g. on a display.

A twentieth embodiment of the invention, comprising the features of the eleventh embodiment, is directed to a system wherein a number of copies of said behavioral data structures is provided, each storing an estimate of the transition probabilities on different time scales, and wherein the system is arranged to operatively issue a warning if one or more corresponding transition probabilities belonging to different time scales diverge from each other more than a predetermined amount.

DETAILED DESCRIPTION OF THE PREFERRED EMBODIMENT

A description of preferred embodiments of the invention is given below. A preferred embodiment of the invention is assumed to function as a separate but integrated part of a self-help system for automated computer support. In the first part of this section, a description of a typical embodiment of such a self-help system is given. Many variations of this basic setup where the function of the invention itself is unaffected and equally beneficial to the user could also be described by someone skilled in the art, having the benefit of this disclosure. In addition, a second part of this section describes the operation of a self-help system according to embodiments of the present invention.

Exemplifying Self-Help System

Figure 1:
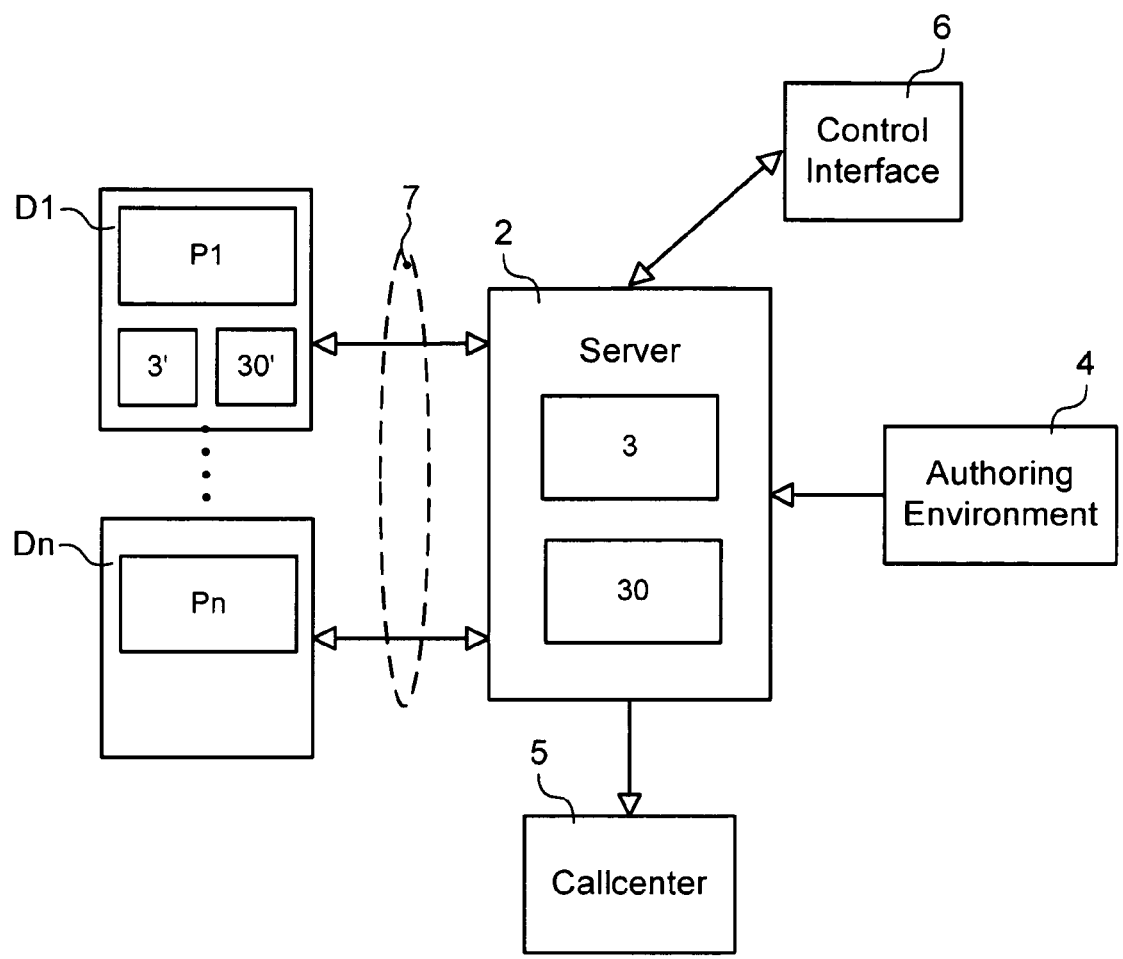
FIG. 1 Overview of an exemplifying self-help based support system in which the invention can be integrated.

Referring to FIG. 1, in a typical case the self-help system is assumed to consist of at least one client program P1 running on a device D1 of the user. Preferably, the device and the client program(s) P1 are capable of communicating with one or several support servers in a support server arrangement 2 containing a support database 3. There may be a plurality of n user devices that are identical or similar to user device D1 and that are running one or several client programs Pn identical or similar to client program P1. This has been illustrated in FIG. 1 in which a dotted line connects user device D1 with a possible $n^{th}$ user device Dn comprising client program arrangement Pn. In addition, the system contains functionality for creating and continually updating the support information in the form of an authoring environment 4. The system may also transfer support cases that cannot be solved automatically to a call center 5 for further investigation by support staff. The system may be monitored and controlled while running via a control center interface 6 used by operators of the system.

The client program P1 contains functionality for presenting visual information in the form of text, images, video and other media to the user, and for interacting with the user, for example by presenting questions to be answered either by selecting among multiple alternatives or in free text format. This information is presented in one or several windows created by a free-standing application or in a web browser window. The client program P1 can run continuously in the background, allowing it to respond to error conditions that may occur, or it can be invoked by the user and started when there is a support need.

Figure 2:
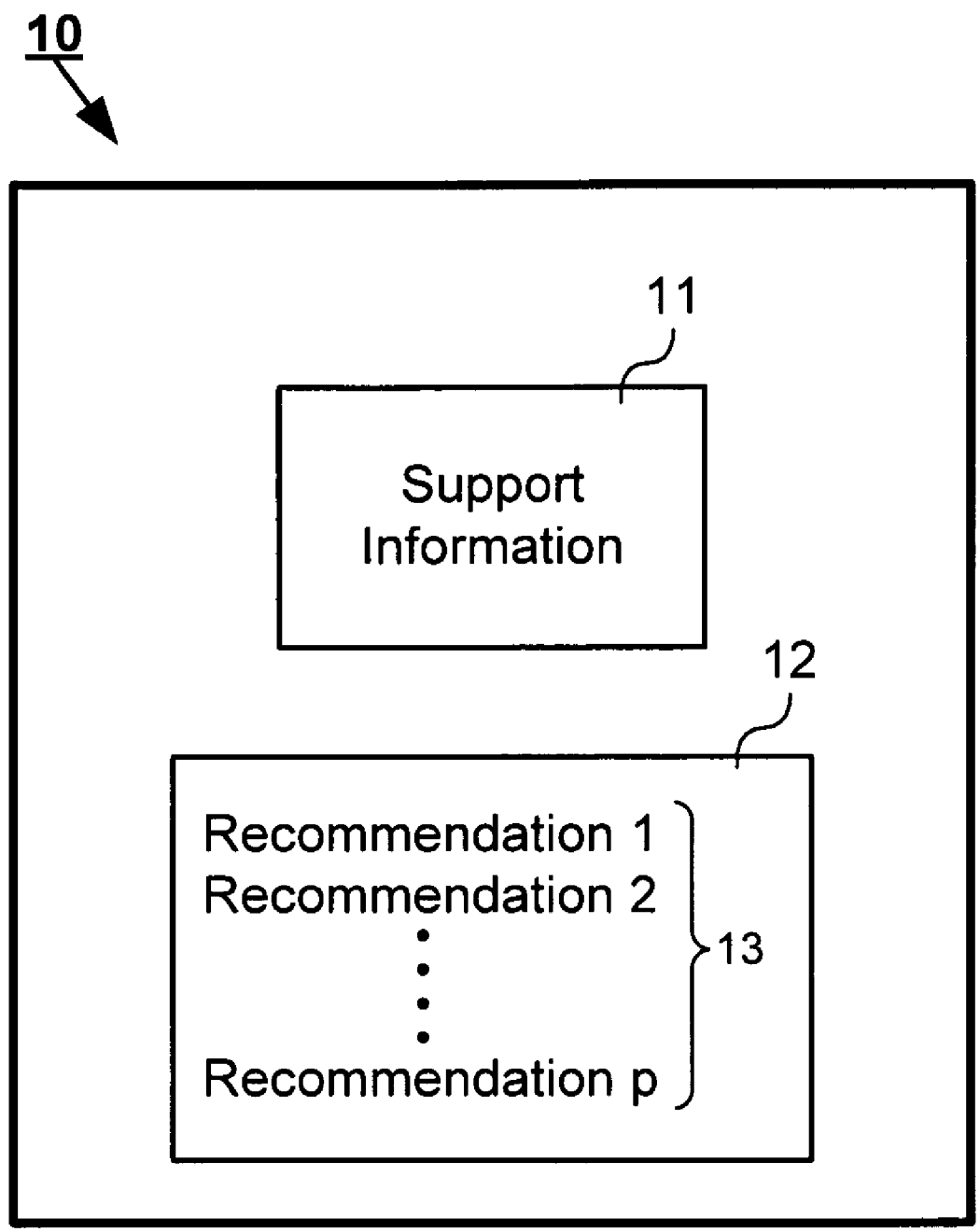
FIG. 2 Sketch of an exemplifying user interface of the self-help system.

In one embodiment, the functionality for visual presentation of the client program P1 may be structured as in FIG. 2, where an area 11 within the application window 10 is used to present support information and questions to the user, and another area 12 is used to present a number of shortcuts recommended by the present invention. The maximal number of shortcut recommendations allowed is determined by the size of the area 12. However, other embodiments may present this information in different ways.

The device D1 and the client program P1 on one side, and the support server arrangement 2 and the support database 3 on another side are assumed to be able to communicate with each other over a network 7, for example a public network such as the Internet or similar. In a preferred embodiment, the communication is encrypted, but in other embodiments non-encrypted communication may be acceptable.

The client program P1 could run on any device containing a processor and connected to a network 7. In other words, the device D1 may be, but are not limited to, a stationary personal computer, a laptop computer, a PDA, a mobile phone, a portable media player equipped with network communication capabilities, a game console, or embedded processors in different types of technical equipment. Depending on the application, the realization of the network 7 could for example be a physical Ethernet, a local wireless network, or a 3G or other mobile phone network allowing data communication.

The client program P1 is also assumed to contain functionality for carrying out automated diagnostic tests of the user's system (i.e. the device D1 and/or the software running thereon), as well as functionality for performing different kinds of changes to the user's system. A number of solutions to support incidents may necessitate complicated technical actions on the user's part, which may be too complex for ordinary users to carry out themselves, even with telephone support, such as solutions involving editing the Windows registry. Automating these solutions allows a wider range of support actions to be carried out without direct involvement of a support technician.

In a preferred embodiment, it is possible for the client program P1 to store information locally in the device D1, e.g. in a cache memory or similarly of the device D1. This allows frequently used information to be accessed quickly, and also allows the system to preload information. It also allows off-line operation when the network 7 is inaccessible. This could be advantageous to corporations where employees use portable equipment when traveling. In some embodiments, this may not be possible, for example where the client program P1 is not allowed to write any information to disk for security reasons. In other embodiments, the entire support database 3 may be stored locally.

The server arrangement 2 contains the database 3 of support information. In a preferred embodiment, all support information is at a fundamental level stored as code in a general purpose (preferably graphical) programming language. Instructions in this language could generate text and graphical output under the operation of the client program 1, and also implement functions that carry out diagnostic tests or automated support actions with respect to the user's system. After transmitting the instructions to the client program 1, these are executed by a virtual machine implemented as part of the client program 1. However, in other embodiments, information in the form of text and images may be handled separately from executable code that implements automated diagnosis and error correction.

It is preferred that the support information in the database 3, even if the information exists in the form of code or similar in a general programming language, can be structured into sub-units. Disjoint subsets of sub-units, e.g. correspond to pages, may be shown to the user with information and/or questions to the user, see e.g. window 10 with presenting area 12 in FIG. 2. Alternatively, the sub-units may comprise or correspond to automated actions, e.g. such as diagnostic tests and/or bug fixes, that do not involve presenting information to the user. One such sub-unit of the information in the database 3 may consist of a number of basic functions in a graphical programming language or similar, joined by links that represent logical transitions.

Figure 3:
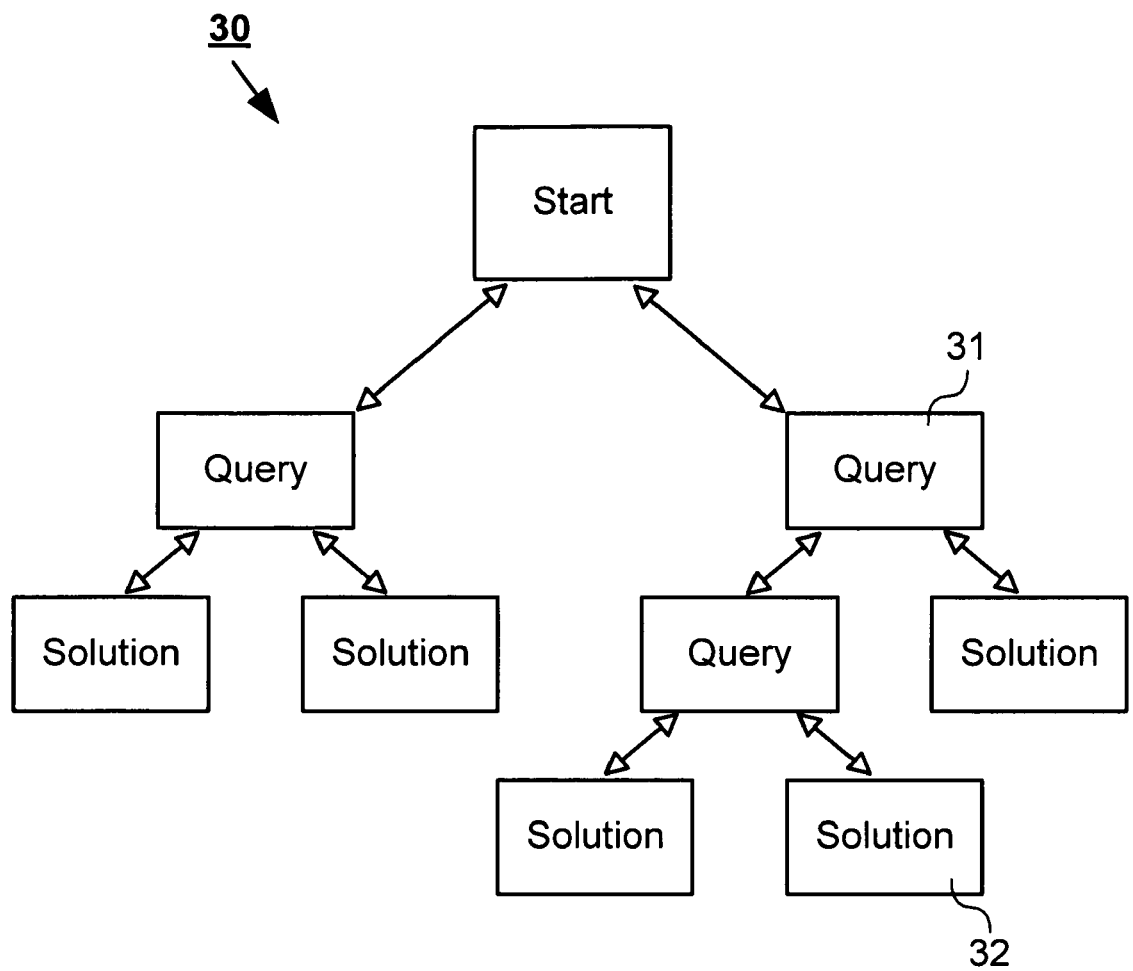
FIG. 3 Example of hierarchical data structure underlying the support database.

Preferably, each such sub-unit forms a node in an aggregated graph (see data structure 30 in FIG. 3), which represents an example structure of the complete support database 3. A certain node in this graph may for example have support information for implementing at least one of the following tasks:
  presenting text and visual information to the user
  requesting and receiving some information from the user, or letting the user choose between a number of alternatives
  performing automatic diagnosis tasks
  performing systems changes and bug fixes
  transferring the user to manual support at a call center
  requesting and receiving feedback on solutions from users As schematically illustrated in FIG. 3, the nodes in the support data structure 30 of database 3 can be divided into intermediate nodes (questions to the user and/or diagnostic or other automated actions) 31 and leaves 32 (which may involve for example automated problem resolution). In practice, the support data structure 30 has more nodes than those shown in FIG. 3, e.g. at least 10,000 or at least 100,000 or at least 500,000 nodes. Moreover, the nodes may be arranged in another pattern than the one shown in FIG. 3.

It is further assumed that an underlying hierarchical structure of nodes can be derived from the database 3 of support information, e.g. a tree structure as exemplified by the support data structure 30, either because it is already structured in a hierarchical manner, or because it is a homomorphism of a hierarchical structure (e.g. a graph derived from a tree by identifying nodes using an equivalence relation; this applies to the case of several different search paths leading to the same node), or because some other algorithm constructs a hierarchical structure such as a tree from the database 3. For example, there could exist an algorithm that in a deterministic fashion removes some links between nodes, so that the result is a tree graph including all nodes. One example of this is removing loops that appear because of an undo functionality, where a user may return to the previous state when making an incorrect choice. However, the method can also be applied in more general cases. It should be added that a certain node is not limited to be associated with only two lower nodes as shown in FIG. 3. On the contrary, a particular intermediate node may be associated with one or several lower nodes (see e.g. FIG. 5).

In addition to the database 3 discussed above, is also preferred that the server 2 contains functionality for communicating with the client program P1 over a network, as described above. The server 2 also allows the support information in the database 3 to be created and updated. This is done in a separate authoring environment 4, which allows the creation of support information ranging from text and images to code that carries automated diagnostic tests and system changes.

Those skilled in the art will readily appreciate that the description of the system setup allows many variations where the predictive system of the invention is equally applicable. Some examples are where the entire support system (combining the client P1 and the server 2) is running on a single machine without network communication, or cases where the network communication involves several steps and intermediate servers. Other variants may involve removing some functionality mentioned above, for example cases where the support system can carry out automated diagnosis but not automated repair, or no automated actions at all.

It will also be realized by those skilled in the art that the applications of the invention are not limited to databases of computer support information. Other cases where a large database of information is connected with a complex technical system, and interacts with the system through queries and actions affecting the system, are also possible areas of application for the invention. This can for example involve support and control of complex industrial equipment (e.g., in process industry) where the support client may be running on an embedded computer, but the queries correspond to sensor readings and actions correspond to changing settings and parameter values in the equipment.

Exemplifying Operation of a Self-Help System

Embodiments of the invention comprises a recommendation system intended to be integrated with a self-help system of the form described above, and designed to provide the user with optimal assistance in the form of recommendations, with the objective of simplifying and minimizing the user's need for interaction with the system. By increasing the ease of use of a self-help system, user acceptance is likely to increase, leading to a more efficient support process and higher productivity within organizations.

From the user's point of view, the interaction with the support system is perceived as follows:

After the support client P1 has been initiated, the user can navigate between nodes in the support data structure 30 of the support database 3 by making choices of paths between nodes and/or by answering queries from the system based on support information in a current node navigated to by the user. A transition occurs when the user(s) navigates from one node to another. The transitions are typically counted for producing transition probabilities. A transition probability is the probability that a user would navigate from a certain node to another node in the support data structure 30. This will be described in more detail later.

At each point in the search process (i.e. at each intermediate node), the system can provide a number of recommendations 13 to the user, displayed in the area 12 of the client interface 10. The recommendations are preferably based on the transition probability, though other parameters may also be used. The number of recommendations presented to the user has an upper limit p determined by the design of the client interface 10. The system may decide to make a smaller number of recommendations than the upper limit, or none at all, in situations where the uncertainty in the predictions is too large.

Figure 4:
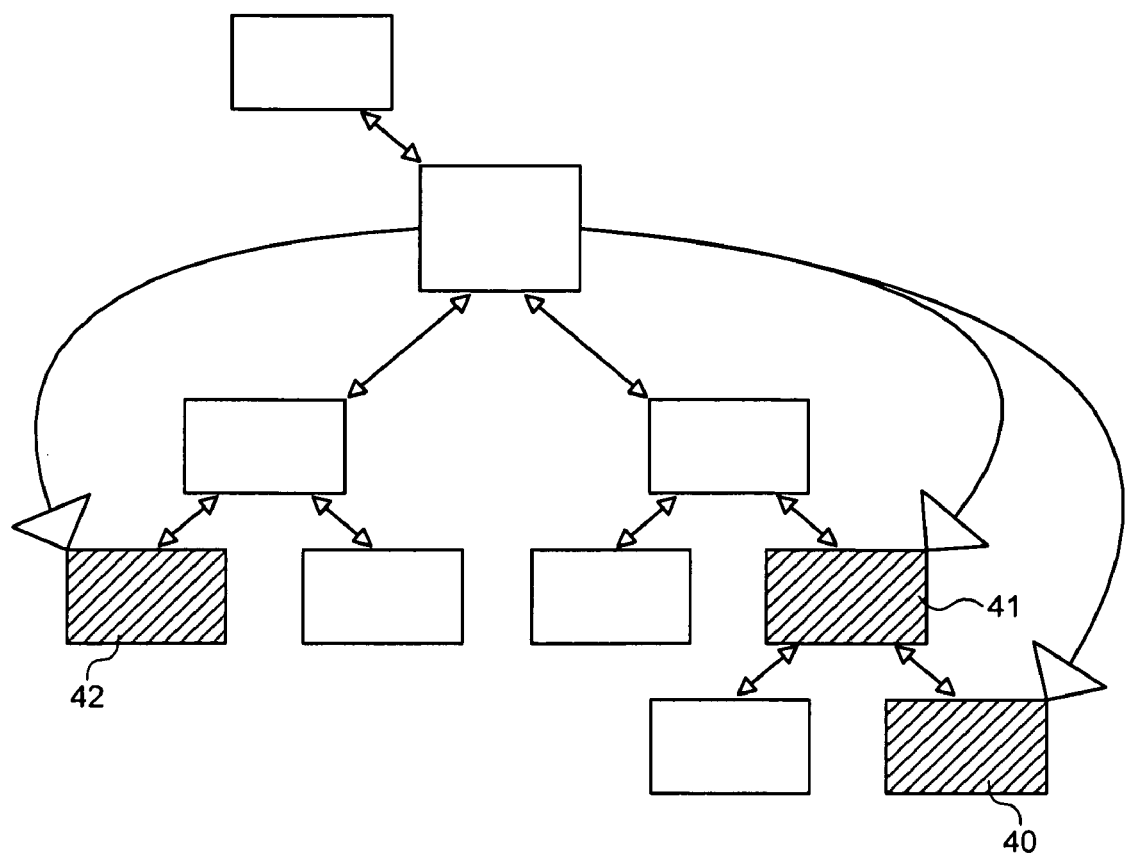
FIG. 4 Examples of recommended shortcuts from a certain node in the data structure.

Referring to FIG. 4, the user can choose one of these recommendations (40-42), which provides a short-cut in the search process. This may either lead directly to a suggested solution to the problem 40, or to an intermediate node 41 closer to the solution, where the user only needs to contribute a smaller amount of information (in terms of choices or answers to queries) to reach the solution. If the user makes an incorrect navigation choice, e.g., by choosing an inapplicable recommendation for another solution 42, he or she may choose to backtrack.

The system has access to at least one of the following forms of information on which it bases its recommendations:
- stored statistical information about the individual user's earlier use of the support system
- statistical information about the behavior of the entire collective of users of the system (including data categorized according to properties of the users' systems)
- information about the individual user's computer system obtained through an automated diagnosis functionality
- information from user feedback on the success of different search paths.

The fact that statistical information about the behavior of other users of the same support server arrangement 2 (i.e. same or corresponding support database 3) is available is a particular advantageous feature of the system, and can be viewed as providing a form of collective intelligence which provides enforcement to a successful search path.

More specifically, the recommendation system proposed in the invention may i.a. comprise the following components:
- One or several databases 3 and/or one or several behavioral data structures 60, 61, 62 containing statistical information on user behavior, both data on individual users and aggregated data from all users of the system.
- A system for collecting data from the underlying support system and updating the statistical information.
- A predictive engine that determines which recommendations to present to the user in each step of the search process, given the information already provided by the user in the search process, information on properties of the user's system, and information on previous behavior of the users of the system.
- A system for presenting recommendations to the user and allowing the user to possibly select one of the recommended transitions.
- A system for gathering explicit and implicit feedback from users on the success of recommendations and solutions.

We now describe preferred implementations of each of these components in more detail:

a. Exemplifying Behavioral Data Structures for Statistical Information

Figure 5:
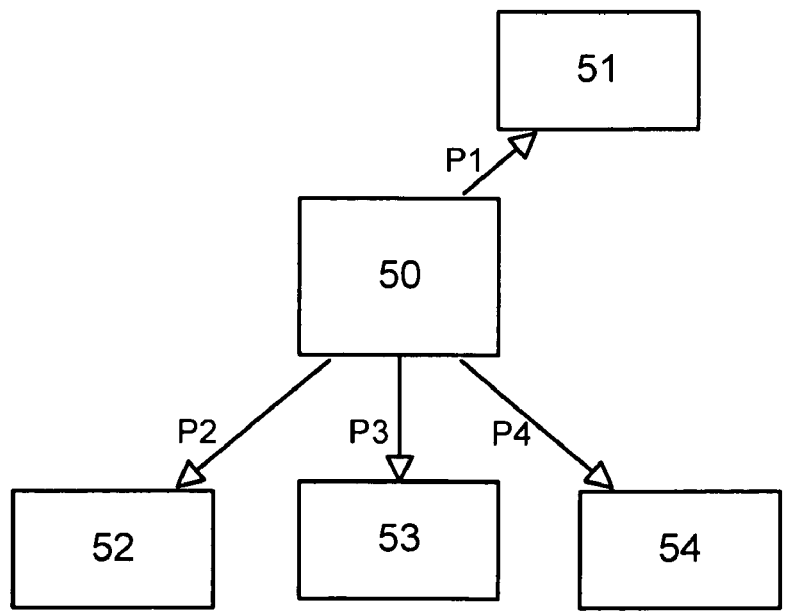
FIG. 5 Examples of estimated transition probabilities from a certain node in the data structure.

In a preferred implementation, the data structures containing statistical information on user behavior are built up as follows:

Starting from the structure of the database of support information 3, described in terms of a hierarchical support data structure 30 such as a tree of nodes shown in FIG. 3, new data structures for storing statistical data on user behavior are generated. One or more trees or similar of transition probabilities Pn between nodes in the data structure 30 are stored and updated each time the system is used (updating methods are described below). Referring to FIG. 5, for a certain node 50 in the data structure 30, counts are kept separately of the transitions to all nodes (51-54) connected to node 50, and each of the cases of search paths eventually resulting in positive, neutral, and negative user feedback. These counts are then converted to estimates of transition probabilities P1-P4, as will be further discussed below, e.g. with reference to FIG. 7.

Figure 6:
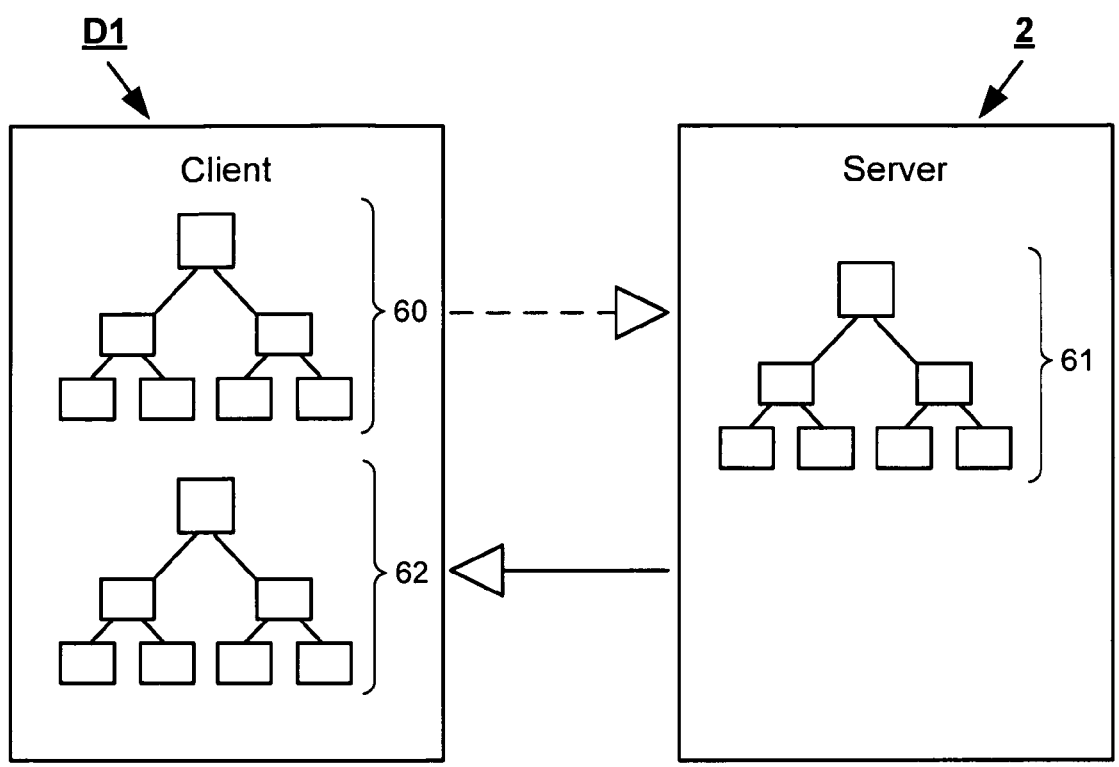
FIG. 6 Example of hierarchical data structures stored locally and globally.

In a preferred embodiment, a global behavioral data structure 61 (referring to FIG. 6) which describes the aggregated behavior of all users is kept at the server 2, and a local behavioral data structure 60 which describes the behavior of each individual user is stored by each client device D1-Dn. The system may also be implemented so that only global information is taken into account, and only a single tree structure 61 is kept at the server 2. A copy 62 of the global information may also be stored locally by each client 1. Typically the structures 60, 61, 62 comprise behavioral data only, whereas support information is comprised by the support database 3 and/or the support data structure 30. In case the user device D1 may operate off-line without connection to the network 7 it is preferred that a copy 3' of the support database 3 and/or a copy 30' of the support data structure 30 is stored locally on the device D1. Generally, it is preferred that the structures 60, 61, 62 correspond to (e.g. are identical or similar to) the structure of the support data structure 30.

In another preferred embodiment, a certain number of copies of tree structures identical to 60 and 61 are kept at the server 2 and the client 1. Each copy stores an estimate of the transition probabilities between nodes on a different time scale, implemented as exponentially weighted moving averages on different time scales, i.e., $$p(t+1) = \text{alpha} \times y(t) + (1-\text{alpha}) \times p(t) \quad (1)$$

where the smoothing factor alpha determines the rate of memory loss, and p(t) is a certain transition probability between nodes in the support data structure 30. The averages on different time scales can be used for comparisons that reveal significant changes in the use of the system, and allow the invention to serve as an early warning system that reacts automatically to suddenly arising common problems by notifying support staff. In other words, a warning may be issued if one or more corresponding transition probabilities belonging to different time scales diverges more than a predetermined amount. The warning may e.g. be issued on a display of a computer connected to the server 2, e.g. on a display being a part of the control center interface 6. The amount may e.g. be an absolute or a relative change occurring between corresponding transition probabilities belonging to different time scales. The amount may e.g. be empirically determined or determined by system parameters. In other words, a warning may e.g. be given if P1(*t*)—or more general Pn(t)—differs more than a predetermined amount from P1(*t*+1)—or more general Pn(t+x).

In another preferred implementation, the behavioral data structure 60, 61, 62 storing data on user behavior is extended to take properties of the users' systems into account. A number of attributes considered relevant to the user's search may be selected by the support staff using the authoring environment 4. These may be global or local, i.e., taken into account everywhere, or only at one or more selected nodes in the graph 30. The values of these attributes are assumed to be properties of the user's system detected by the automated diagnosis functionality (typically a part of the client program 1), e.g. a functionality being identical or similar to the automated diagnosis tools mentioned in the introduction to this specification. The attributes are assumed to be binary or to take a small number of discrete values, for example indicating whether a certain program or version of a program is installed in the user's system or not.

In this implementation, the data structure is extended to store estimated transition probabilities given different combinations of values of the attributes taken into account in each node, e.g. the transition probability for each intermediate node can be increased or decreased depending on the properties of the user system (the attributes), and preferably also the support information related to the node in question. In an implementation that only allows a small number of attributes, an array with entries for each combination of attribute values can be used. For a larger number of attributes, a list containing only the actually occurring combinations could be gradually expanded at each node.

In another preferred implementation, the space of attribute value combinations is gradually subdivided, giving rise to a growing data structure at each node. The subdivision is carried out by temporarily storing statistics for several different candidate binary subdivisions, each determined by fixing some attribute (completely or partially). The preferred new subdivision is that which produces the largest difference between the distributions of transition probabilities generated when fixing the selected attribute to its different values. The difference between the two probability distributions is preferably measured using the Kullback information defined in information theory.

If the difference measure is smaller than a given threshold, no subdivision is performed. When a subdivision has been carried out, new candidate subdivisions are generated by fixing different attributes, and the process is repeated. In this way, only the most informative combinations of attribute values are used at each node.

b. Exemplifying Method for Updating the Statistical Information.

In a preferred implementation, each client program P1 updates its local statistical data structure 60 each time the user interacts with the client program P1 and makes a transition from one node to another in the support data structure 30. In an even more preferred implementation, information in the local statistical data structure 60 of each client P1 to Pn (i.e. of each user device D1 to Dn) is transmitted to the support server 2, typically at regular intervals. In the server 2 the information is stored in a now updated global statistical data structure 61 (the structure being similar or identical to the local statistical data structure 60) that adds the global statistics from all users. A copy 62 of the global statistics stored in the data structure 61 may be maintained in the device D1 by the client program P1 in order to be used by the predictive engine described in more detail below. The client data structure 62 in the device D1 is also updated regularly to stay substantially identical to the data structure 61 in the server 2. The system is not sensitive to the small differences between the data in these two structures that may arise if updates are not done synchronously.

In another implementation, only global statistics is used to make predictions in the client 1, and the local statistical data structure 60 may be omitted. Instead, each action by the user may be reported back to the server 2, which adds the data to the global statistics data structure 61. Each client P1 then still keeps a data structure 62 which stores a copy of the global data 61. The local data structure 61 is then updated by the server 2, typically at regular intervals.

In another embodiment described above, where statistical averages are kept on several different time scales, each individual transition probability estimate is updated according to $$p(t+1) = \text{alpha} \times y(t) + (1 - \text{alpha}) \times p(t) \tag{2}$$

with a different value of the smoothing factor alpha for each copy in the data structures involved.

c. Predictive Engine

Each time the user makes a transition in the database 3, e.g. represented by the support data structure 30, a new set of recommendations are generated and displayed in the subwindow 12 of the client program 1. The suggestions are based on maximizing the expectation value of the time saved for the user, preferably under the condition that the suggestion was actually correct and/or selected/confirmed by the user. The suggestions may consist of any node in the support data structure 30; either leaves, which provide an immediate solution to the problem at hand, or intermediate nodes, where the user must answer additional questions or make additional choices before reaching a solution.

The new recommendations presented when the user makes a transition are calculated as follows:

For each node n in the support data structure 30 located below the current node, the expectation value of the time gained by recommending that node is calculated. This is approximated as the product of the estimated probability of n being correct, i.e. on a path to the correct solution, and the estimated time gained by jumping immediately to n.

Figure 7:
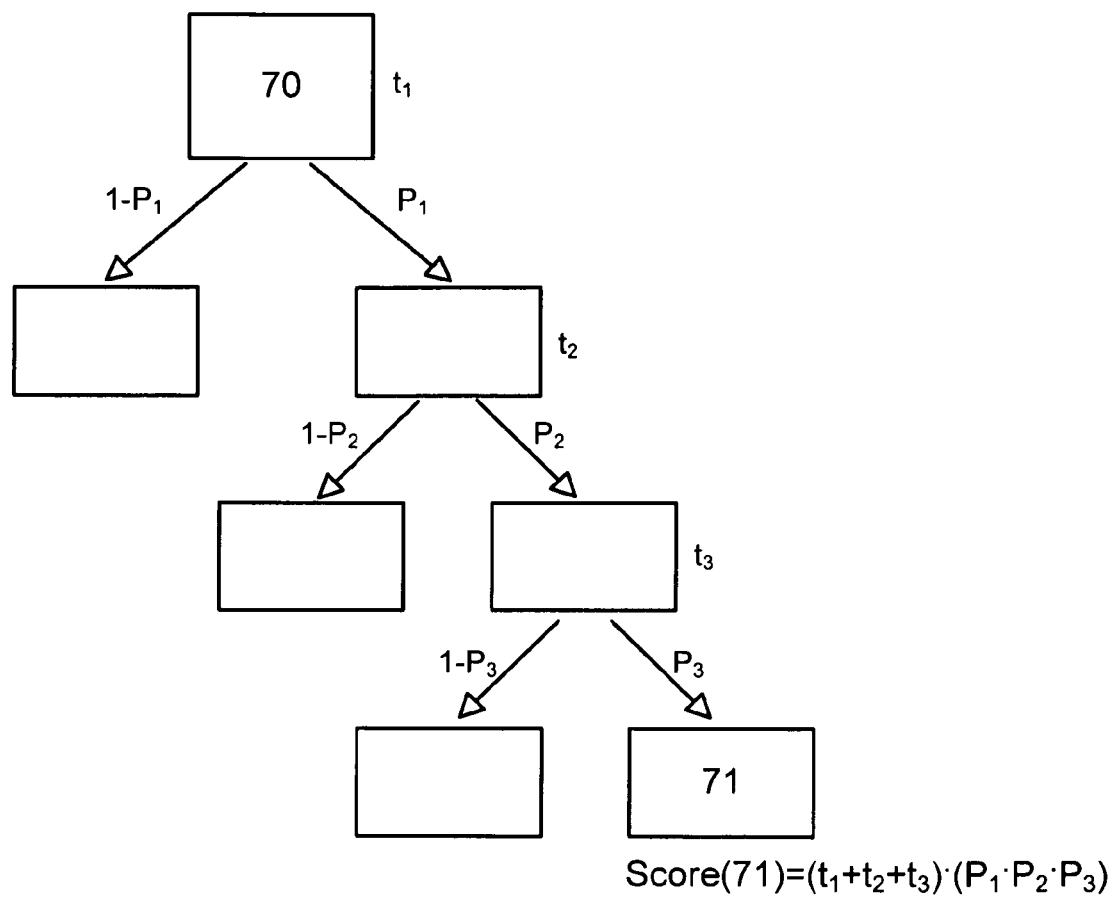
FIG. 7 Example illustration of a predictive engine.

The probability of the node n (e.g., node 71 in FIG. 7 showing a support data structure similar to data structure 30) being correct is estimated from the transition probabilities collected in the local and global statistics data structures (e.g., 60 and 61). In the case where only global statistics is taken into account, this is calculated as the product of all transition probabilities along the path from the current node 70 to node 71, with the transition probabilities taken from the local data structure 62 if the calculation is done by the client P1. In a preferred implementation, only transitions involving positive user feedback are included in the statistics, but transitions involving no feedback may also be included. The calculations could also be carried out on the server 2, in which case the data structure 61 is used. An example is shown in FIG. 7, wherein P1-P3 represents the probability that a transition from one node to another in the path from node 70 down to node 71 will occur.

In the case where both local and global statistics is available, these are linearly weighted together into one set of probabilities, and the resulting set of probabilities is then used as described above.

The average search time gained by accepting a recommendation is calculated as the sum of the expected time intervals needed to pass through each node along the path from the current node to the recommended node. This amount of time varies from node to node depending on the complexity of the information presented to the user and the complexity of any choices that need to be made. An example is shown in FIG. 7, wherein t1-t3 represents the average time spent by the user(s) at each node respectively in the path from node 70 down to leaf node 71.

Before we proceed it should be emphasized that the invention is not limited to average time values alone, e.g. as those in t1-t3 described above. On the contrary, any suitable time value indicative of the time spent by one or several users at each node can be used, e.g. a median time value or a weighted time value or similar.

In a preferred implementation, the estimate of the average time per node is determined from actual user data, by measuring, storing and continuously updating the average time spent by users at each node. In another preferred implementation, more extensive statistics is kept by conditioning this information on the following transition, so that each node keeps as many estimates as there are transitions from the node.

In a third implementation, this value is calculated from a simple mathematical model of the decision time needed at each node. This could for example have one term proportional to the amount of text or other information presented on the page, and another term proportional to the number of choices presented to the user (or a function of that number, for example growing slower than linearly). Those skilled in the art readily realize that many other mathematical models could be used, for example based on assumptions from psychology.

These two estimates (probability and time) multiplied together then provide a score for each node according to the formula above.

An example of such a score calculation is shown for node 71 in FIG. 7, represented by the expression:

$$\text{Score}(71) = (t1 + t2 + t3) \times (P1 \times P2 \times P3) \quad (3)$$

Here, t1-t3 are the average time spent by the user(s) at each node respectively in the path from node 70 down to node 71, whereas P1-P3 are the probability that a transition from one node to another in the path from node 70 down to node 71 will occur.

The data structure 30 is searched for nodes with maximal score using standard methods from computer science. In a preferred implementation methods analogous to alpha-beta pruning can be used. It should however be clear to those skilled in the art that numerous other algorithmic implementations (exact or approximate) are possible in order to find the best nodes in the tree.

The output of this algorithm is a list of a predetermined number of nodes, corresponding to those with highest expected time gain found by the algorithm. In a preferred implementation, only those nodes with an expected time gain higher than a predetermined threshold are actually shown to the user, in order to avoid uncertain or in other ways useless recommendations.

d. Presentation of Information

At each point in the search process, the system can provide a number of recommendations to the user determined by the predictive engine described above. The recommendations are shown in area 12 of the client user interface 10 in FIG. 2. Each recommendation is represented by a text string (or other visual information) stored in a separate field in the database 3.

As mentioned above, the number of recommendations presented to the user typically has an upper limit determined by the design of the user interface. The system may decide to make a smaller number of recommendations than the upper limit, or none at all, in situations where the uncertainty in the predictions is too large.

The user can choose one of these recommendations by clicking on the appropriate link, which provides a short-cut in the search process. This either leads directly to a suggested solution of the user's problem, or to an intermediate node closer to the solution, where the user needs to contribute a smaller amount of information to reach the solution.

e. Feedback from Users

Feedback is requested each time a solution is carried out. In one preferred implementation, feedback is simply given as a yes/no answer to a question asking whether the solution worked. In most cases, the will be no mechanism for enforcing that users give feedback (though that could be the case in a controlled environment within an organization). In another implementation, implicit feedback determined from measurements of how long time users spend on different pages (for example giving negative feedback to solution pages that the user leaves immediately) could be used as an alternative.

Combining the steps described above creates a system that continuously makes recommendations during the search process, in order to minimize the amount of time spent by the user to find a solution to a support problem. The system is capable of making use both of automatically detected information about the user's system, and information gathered from the behavior of other user's of the support system. By combining data from the entire user collective with data on the individual user, The system can also be implemented as an early warning system that gives notice when new problems appear. If a number of users search for the same information close in time, this can be noticed by comparing statistics gathered on different time scales. If a solution to the problem already exists in the database, that solution automatically becomes more likely to be given as a recommendation to users.

While this invention has been described with references to its preferred embodiments, it will be understood by those skilled in the art that numerous changes in form and detail can be made without departing from the scope of the invention given in the description above.

The invention claimed is:

1. A method for assisting user searches in a support system, comprising:
    providing a support data structure with nodes comprising support information of a support database,
    providing at least one behavioral data structure comprising information about the time the user(s) spend at said nodes, and information about the transition probabilities between each upper node and its lower nodes,
    calculating for each lower node that is located below a current node, navigated to by a user of the support data structure, the expectation value of the time gained by navigating directly to that lower node,
    selecting at least one of the lower nodes based on said expectation value.

2. A method according to claim 1, comprising:
    providing at least one global behavioral data structure in a server arrangement being used by several user devices and which at least comprises the support data structure.

3. A method according to claim 1, comprising:
    providing at least one local behavioral data structure or at least one global behavioral data structure in a user device which at least comprises a copy of the support data structure.

4. A method according to claim 1 comprising:
    updating at least one of; the time the user(s) spend at said nodes, or the transition probabilities of the behavioral data structure when a user of the support data structure makes a transition in the support data structure using a user device.

5. A method according to claim 4, comprising:
    updating the time or transition probabilities provided that the transition is confirmed by a positive user feedback.

6. A method according to claim 2, comprising:
transmitting information from the local behavioral data structure of each user device to the support server so as to update the global statistical data structure.

7. A method according to claim 1, comprising:
providing the behavioral data structure with information about the properties of a user system, and
increasing or decreasing at least one of the transition probabilities with respect to that user system depending on said properties.

8. A method according to claim 1, comprising:
selecting a lower node if the expected time gain is higher than a predetermined threshold.

9. A method according to claim 1, comprising:
presenting a recommendation providing a short-cut to said at least one selected lower node.

10. A method according to claim 1, comprising:
providing a number of copies of said behavioral data structures, each storing an estimate of the transition probabilities on different time scales, and
issuing a warning if one or more corresponding transition probabilities belonging to different time scales diverge from each other more than a predetermined amount.

11. A support system for assisting user searches, which system comprises:
a support data structure with nodes comprising support information of a support database,
at least one behavioral data structure comprising information about the time the user(s) spend at said nodes, and information about the transition probabilities between each upper node and its lower nodes,
wherein the system comprises a processor and a memory and is arranged to operatively:
calculate for each lower node that is located below a current node, navigated to by a user of the support data structure, the expectation value of the time gained by navigating directly to that lower node, and
select at least one of the lower nodes based on said expectation value.

* * * * *